(12) United States Patent
Beals et al.

(10) Patent No.: US 9,485,533 B2
(45) Date of Patent: Nov. 1, 2016

(54) SYSTEMS AND METHODS FOR ASSEMBLING AND EXTRACTING COMMAND AND CONTROL DATA

(71) Applicant: Nagrastar LLC, Englewood, CO (US)

(72) Inventors: William Michael Beals, Englewood, CO (US); Nicolas Fischer, Cheseaux (CH); Benjamin Brian Ellis, Denver, CO (US); Gregory Duval, Englewood, CO (US)

(73) Assignee: NAGRASTAR LLC, Englewood, CO (US)

( * ) Notice: Subject to any disclaimer, the term of this patent is extended or adjusted under 35 U.S.C. 154(b) by 0 days.

(21) Appl. No.: 13/799,774

(22) Filed: Mar. 13, 2013

(65) Prior Publication Data

US 2014/0282808 A1  Sep. 18, 2014

(51) Int. Cl.
*H04N 21/43* (2011.01)
*H04N 21/435* (2011.01)
*H04N 21/418* (2011.01)
*H04N 21/434* (2011.01)
*H04N 21/845* (2011.01)

(52) U.S. Cl.
CPC ........ *H04N 21/435* (2013.01); *H04N 21/4184* (2013.01); *H04N 21/4343* (2013.01); *H04N 21/845* (2013.01); *H04N 21/8456* (2013.01)

(58) Field of Classification Search
None
See application file for complete search history.

(56) References Cited

U.S. PATENT DOCUMENTS

| | | |
|---|---|---|
| 4,696,034 A | 9/1987 | Wiedemer |
| 5,742,680 A | 4/1998 | Wilson |
| 5,852,290 A | 12/1998 | Chaney |
| 5,991,400 A | 11/1999 | Kamperman |
| 6,035,037 A | 3/2000 | Chaney |
| 6,292,490 B1 | 9/2001 | Gratacap et al. |
| 6,409,089 B1 | 6/2002 | Eskicioglu |
| 6,594,361 B1 | 7/2003 | Chaney et al. |
| 6,779,115 B1 | 8/2004 | Naim |
| 6,826,185 B1 | 11/2004 | Montanaro et al. |
| 7,062,584 B1 | 6/2006 | Worrell et al. |

(Continued)

FOREIGN PATENT DOCUMENTS

| | | |
|---|---|---|
| CA | 2318936 | 4/2004 |
| EP | 0740478 | 10/1996 |

(Continued)

OTHER PUBLICATIONS

International Search Report and Written Opinion for PCT/US2013/039803, mailed Jan. 23, 2014, 13 pages.

(Continued)

*Primary Examiner* — Cai Chen
(74) *Attorney, Agent, or Firm* — Merchant & Gould

(57) ABSTRACT

The present disclosure relates to systems and methods for assembling and extracting command and control data. In embodiments of the present disclosure, the command and control data is segmented and inserted into multiple packet headers. The header packets are identified by flags such as "First portion," "Middle portion," "Last portion," or "Null Byte." When a receiver extracts the command and control data from the headers, it tracks the flags associated with the headers. The command and control data is saved to buffer in association with its associated flag. The receiver uses the flags to determine when all command and control data headers have been received. The command and control data is then reconstructed and used to decrypt audio visual content.

20 Claims, 12 Drawing Sheets

(56) References Cited

U.S. PATENT DOCUMENTS

| | | | |
|---|---|---|---|
| 7,184,093 | B2 | 2/2007 | Manning |
| 7,469,420 | B2 | 12/2008 | Duffield et al. |
| 7,508,942 | B2 | 3/2009 | Candelore |
| 7,577,846 | B2 | 8/2009 | Kudelski et al. |
| 7,647,641 | B2 | 1/2010 | Dubroeucq et al. |
| 7,925,016 | B2 | 4/2011 | Candelore |
| 8,505,064 | B2 | 8/2013 | Hildebrand et al. |
| 2001/0012366 | A1 | 8/2001 | Van Rijnsoever et al. |
| 2003/0002577 | A1 | 1/2003 | Pinder |
| 2003/0059047 | A1 | 3/2003 | Iwamura |
| 2003/0091160 | A1 | 5/2003 | Enbom et al. |
| 2003/0194091 | A1 | 10/2003 | Wajs |
| 2004/0001591 | A1 | 1/2004 | Mani et al. |
| 2004/0181800 | A1 | 9/2004 | Rakib et al. |
| 2004/0260823 | A1 | 12/2004 | Tiwari et al. |
| 2005/0005287 | A1* | 1/2005 | Claussen ............... H04N 7/163 725/31 |
| 2006/0026295 | A1 | 2/2006 | Iwamura |
| 2007/0028260 | A1 | 2/2007 | Williams et al. |
| 2007/0067810 | A1* | 3/2007 | Durden et al. .................. 725/80 |
| 2007/0121008 | A1 | 5/2007 | Kanoh |
| 2007/0143784 | A1 | 6/2007 | Kubota et al. |
| 2007/0146542 | A1 | 6/2007 | Strasser |
| 2007/0250872 | A1 | 10/2007 | Dua |
| 2007/0266182 | A1 | 11/2007 | Lanning |
| 2008/0163290 | A1 | 7/2008 | Marko |
| 2008/0165962 | A1 | 7/2008 | Kawano et al. |
| 2008/0279379 | A1 | 11/2008 | Muijen |
| 2009/0086657 | A1 | 4/2009 | Alpert et al. |
| 2009/0144456 | A1 | 6/2009 | Gelf et al. |
| 2009/0199283 | A1 | 8/2009 | Jain |
| 2010/0169940 | A1 | 7/2010 | Howarter et al. |
| 2010/0272257 | A1 | 10/2010 | Beals |
| 2011/0010734 | A1 | 1/2011 | Newell |
| 2011/0119487 | A1* | 5/2011 | Alexander ............ H04L 9/0891 713/160 |
| 2013/0185566 | A1 | 7/2013 | Pang |
| 2014/0282685 | A1 | 9/2014 | Beals et al. |

FOREIGN PATENT DOCUMENTS

| | | |
|---|---|---|
| EP | 1662361 | 5/2006 |
| EP | 2204997 | 7/2010 |
| EP | 2541959 | 1/2013 |
| WO | WO 2007/072211 | 6/2007 |
| WO | WO 2011-120901 | 10/2011 |

OTHER PUBLICATIONS

International Search Report and Written Opinion for PCT/US2013/039806, mailed Jan. 23, 2014, 12 pages.

ISO 7816—Smart Card Standards Overview. Artemis Solutions Group LLC, 2004 (17 pages).

U.S. Appl. No. 13/799,891, Non-final Rejection mailed Feb. 3, 2015, 22 pages.

U.S. Appl. No. 13/799,891, Amendment and Response filed Jul. 6, 2015, 13 pages.

U.S. Appl. No. 14/499,956, Non-Final Rejection mailed Jul. 30, 2015, 19 pages.

U.S. Appl. No. 14/500,037, Non-Final Rejection mailed Aug. 10, 2015, 20 pages.

U.S. Appl. No. 13/799,891, Final Rejection mailed Aug. 10, 2015, 14 pages.

U.S. Appl. No. 14/500,113, Non-Final Rejection mailed Aug. 12, 2015, 21 pages.

U.S. Appl. No. 14/500,037, Final Rejection mailed Feb. 16, 2016, 9 pages.

U.S. Appl. No. 14/500,113, Final Rejection mailed Feb. 17, 2016, 8 pages.

U.S. Appl. No. 14/608,900, Non-Final Rejection mailed Mar. 21, 2016, 12 pages.

European Patent Application No. 15184485.9, EESR mailed Mar. 3, 2016, 9 pages.

U.S. Appl. No. 13/799,891, Amendment and Response filed Jun. 14, 2016, 16 pages.

U.S. Appl. No. 13/799,891, Final Rejection mailed Jul. 18, 2016, 13 pages.

U.S. Appl. No. 14/499,956, Amendment and Response filed May 31, 2016, 11 pages.

U.S. Appl. No. 14/499,956, Non-Final Rejection mailed Jun. 17, 2016, 10 pages.

U.S. Appl. No. 14/500,037, Amendment and Response filed Jun. 16, 2016, 12 pages.

U.S. Appl. No. 14/500,037, Non-Final Rejection mailed Jun. 24, 2016, 10 pages.

U.S. Appl. No. 14/500,113, Amendment and Response filed Jun. 17, 2016, 12 pages.

U.S. Appl. No. 14/500,113, Non-Final Rejection mailed Jun. 28, 2016, 10 pages.

U.S. Appl. No. 14/608,900, Amendment and Response filed Jun. 21, 2016, 17 pages.

* cited by examiner

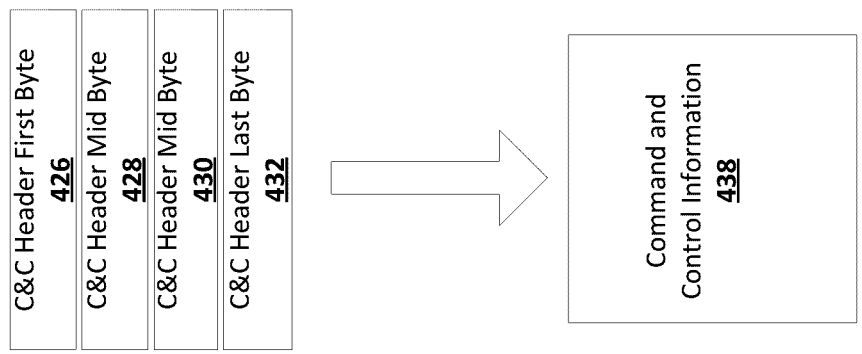

SYSTEMS AND METHODS FOR ASSEMBLING AND EXTRACTING COMMAND AND CONTROL DATA

BACKGROUND

Oftentimes, video systems rely on communication between a set-top box and a smart card by means of multiplexed video streams. Multiplexed video streams sent between a set-top box and a smart card are typically comprised of a plurality of audio visual ("A/V") packets (the "A/V packets"). Traditionally, a stream of A/V packets that includes A/V data is typically transmitted separately from a stream of packets of command and control ("C&C") data (the "C&C packets"). The A/V data within a stream of A/V packets typically includes the scrambled content to be provided to a consumer for display. The C&C data within a stream of C&C packets typically includes various information, e.g., information necessary to descramble the audio visual content. For example, the C&C packets typically may include an Entitlement Control Message ("ECM"). An ECM typically includes keys that may be used to decrypt the audio-visual content. As another example, the C&C packets typically may also include an Entitlement Management Message ("EMM"). An EMM typically provides general information about the subscriber, e.g. including the status of a subscription. Various standards exist for transmitting different streams within an encapsulated container format, e.g., a transport stream compliant with the MPEG-TS format (i.e., the ISO/IEC 13818-1, ITU-T Recommendation H.222.0). These standard transmission formats maintain the separation inherent between the different types of streams they encapsulate.

SUMMARY

Embodiments of the present disclosure relate to the extraction and assembly of C&C data from packet headers. Specifically, a C&C packet may be divided into multiple segments. These segments may be associated with a flag identifying the C&C data as first portion, middle portion, last portion, or null byte. The C&C segment and its associated flag may then be inserted into a packet header. The packet and packet header may be transmitted to a receiver. The receiver may extract the header from the packet and identify a first portion flag associated with a C&C header. The C&C data associated with a first portion flag is stored in a buffer. The receiver may then identify the middle portions and last portion flags and store the associated C&C data in a buffer. Upon identifying the last portion flag, the C&C data is flagged as complete and ready for execution. The assembled C&C data may then be processed and used to decrypt encrypted A/V packets.

In embodiments, the C&C portions may be used to communicate C&C data from a set-top-box to a smart card and vice versa. Embodiments of the present disclosure segment the C&C data and insert the C&C portions into one or more A/V packet headers. By utilizing space in the A/V packet headers to carry C&C portions, there is a guaranteed transmission channel for command and/or control data regardless of how much A/V data is being sent.

BRIEF DESCRIPTION OF THE DRAWINGS

FIG. 4B depicts re-assembly of command and control data from the Super Packet Transport Stream.

DETAILED DESCRIPTION

The present disclosure describes a method for communicating command and control ("C&C") data from a set-top box to a smart card and vice versa. Embodiments of the present disclosure segment the C&C data and insert the C&C portions into one or more A/V packet headers. In embodiments, all of the packets in a data transmission may include the C&C portions. Certain transmission protocols require every A/V packet to have an A/V packet header. By utilizing space in the A/V packet headers to carry C&C portions, there is a guaranteed transmission channel for C&C regardless of how much A/V data is being sent. As such, regardless of how saturated the communications channel is, the C&C may be utilized to provide command and/or control information without interruption of the A/V data. Furthermore, in embodiments, the C&C data can be transmitted with low latency and it will not impede the flow of A/V packets. In embodiments, C&C information may include descrambling information (e.g., descrambling keys and/or control words), settings information (e.g., device operation settings), and or other type of command or control data that may be utilized by a device or application to perform a task, adjust a configuration or setting, etc.

In an embodiment, the A/V packet header includes two fields for C&C. The first field may be a flag that indicates a "First portion," a "Middle portion," a "Last portion," or a "Null portion." Because there are four possible values for this flag, it can optimally be encoded and carried in two bits. The second field is a data byte which contains one (1) byte of C&C data, if the flag field is First portion, Middle portion, or Last portion. If the flag field is Null Byte, then the C&C data byte is ignored (although still present in the A/V packet header). By examining the flag field, the entity (e.g., device, hardware, software application, etc.) extracting the C&C portions can understand whether all C&C portions have been extracted or whether more are still being provided. The extracted C&C portions may then be stored. When the flag field indicates Last portion, there are no more C&C portions comprising the C&C data, so the buffered C&C portions can be concatenated and processed.

Figure 1:
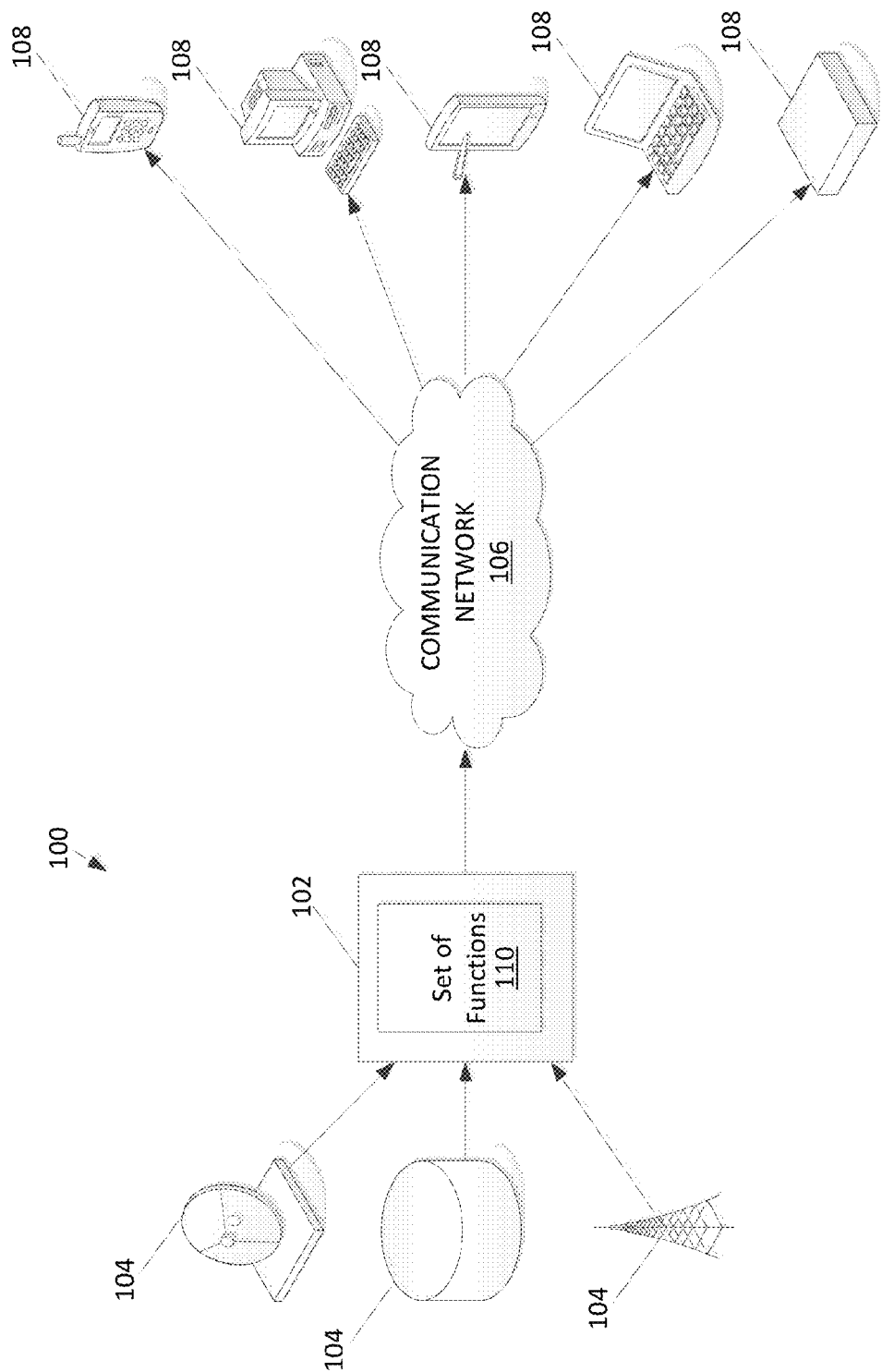
FIG. 1 illustrates an embodiment of a communications system.

FIG. 1 illustrates a communications system that utilizes header based command and control technology. The communications system includes a head-end device 102 that receives content from content providers 104 and distributes the content across a communication network 106 to various recipient devices 108. The recipient devices can access the content and display it to a user. A recipient device 108 can be any device capable of receiving and decoding a data transmission stream over communication network 106. Such devices include, but are not limited to, mobile phones, smart phones, personal digital assistants (PDAs), satellite or cable set-top boxes, desktop computers, laptop computers, tablet computers, televisions, radios, or any other device known to the art.

In embodiments, the head-end 102 may be the distribution point of a cable television provider (e.g., a cable head-end), the distribution of point of a satellite television provider (e.g., a satellite uplink), or a server broadcasting content over the Internet. One of skill in the art will appreciate that the head-end 102 may be any type of device, or a collection of devices (as the case may be), that are capable of receiving, encrypting, and broadcasting, or otherwise transmitting, content over a network.

In one embodiment, the content broadcast over communications system 100 may be generated by the head-end device 102. In other embodiments, the head-end device may receive content from one or more content providers 104. In such embodiments, the head-end device 102 is in electrical communication with one or more content providers 104. For example, a content provider may be a cable, terrestrial, or satellite television station that transmits content to the head-end device 102 over a wired (e.g., cable, fiber optic, Internet connection, etc.) or wireless connection (e.g., via radio, microwave, satellite communications, etc.). In other embodiments, the content may reside in a datastore that is in electrical communication with the head-end 102. While FIG. 1 depicts the content providers 104 as being separate entities from the head-end 102, in other embodiments, the content providers 104 and head-end device 102 may be a single entity.

The head-end 102 is tasked with distributing the content over a network 106 to various recipient devices 108. In embodiments, the network 106 may be the Internet, a cable network, a fiber optic network, a satellite communications network, a terrestrial broadcasting network (e.g., networks communicating over radio or microwave transmission mediums), a cellular data network, a wide area network (WAN), a local area network (LAN), a cellular data network, a plain old telephone service (POTS) network, or any other type of communication network capable of streaming and/or broadcasting data transmissions between various devices. One of skill in the art will appreciate that the systems and methods disclosed herein can be practiced regardless of the type of communication network used to transmit data between devices. In many cases, the head-end 102 will broadcast the content in a data transmission stream over the communications network rather than sending content to a particular device. Because the content is being broadcast over the communication network 106, the transmission can be received by any number of devices capable of interacting with the communication network 106. In order to prevent un-authorized users from accessing the broadcasted data transmission stream, the head-end 102 typically encrypts or re-encrypts (as the case may be) the data transmission stream before it is broadcast over the communication network 106. Although not illustrated in FIG. 1, the communication network may also be used to perform two-way communication between the head-end 102 and the recipient devices 108.

Figure 2:
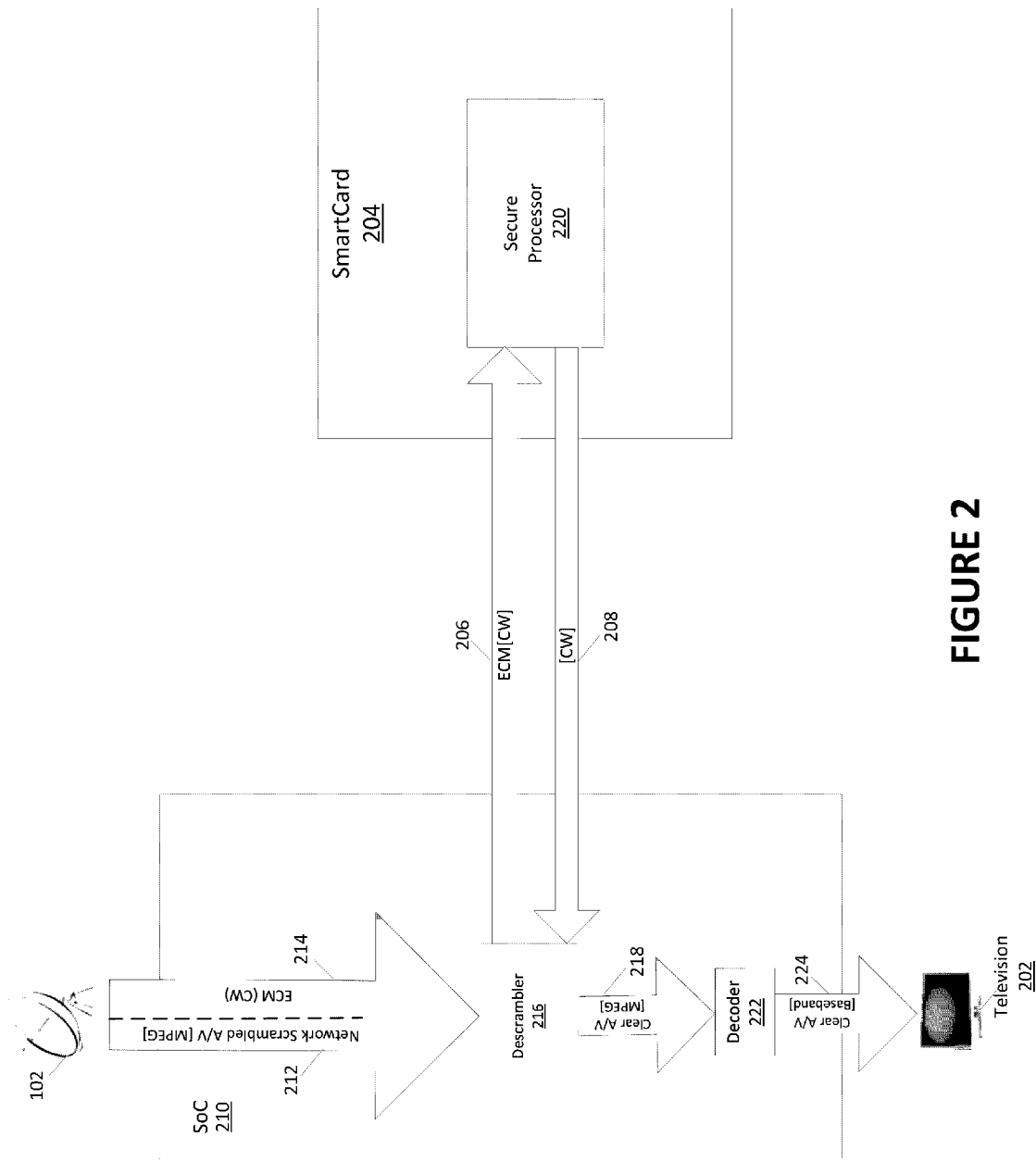
FIG. 2 illustrates an implementation of audio visual descrambling in a set-top box.

As shown in further detail with regard to FIG. 2, a System on Chip (SoC) 210 on a recipient device, such as a set-top box, is communicatively coupled, for example in transmission lines 206 and 208, to a removable security element such as smart card 204. The scrambled audio visual (A/V) content 212 and ECM packet(s) 214 are received by the SoC 210 in the set-top box from a network input 102 (satellite, cable, broadband internet, or other source). The ECM packet(s) 206 is/are separated and sent to a smart card 204. The smart card 204 may include a secure processor 220 to perform secure processing in addition to computing or extracting an A/V descrambling key. In embodiments, for example, in a DVB environment, the A/V descrambling key may be a network control word ("NCW"). The NCW indicates a global value for a given A/V stream at a given moment in time. The NCW may change every few seconds or minutes. The smart card 204 returns the NCW 208 to the SoC 210. The SoC 210 uses the NCW 208 to descramble 216 the A/V stream 212. The clear A/V 218 can then be decompressed by decoder 222 and transmitted to a display device such as a TV or monitor, 202 as a clear A/V baseband stream 224. While embodiments described herein have described operation in a DVB environment, one of skill in the art will appreciate that other environments used for broadcasting or otherwise transmitting secure content may be employed without departing from the scope of the present disclosure.

In such architecture, there are growing concerns about the security. For example, typical content transmission environments present there are common problems. First, the descrambler is embedded in the SoC, which is not a replaceable element in the set-top box. As the speed of computers increases, brute force attacks on the NCW may become feasible. In addition, advances in cryptographic analysis reveal weaknesses in scrambling algorithms that were previously considered secure. Because the descrambler is embedded in the SoC, updating a descrambler to respond to these issues is often a costly procedure, and, in many cases requires the purchase of new hardware. Second, there is growing concern about piracy due to control word sharing (CWS) attacks in broadcast networks. By sharing the NCW over the Internet or other network, a pirate can decrypt a full-bandwidth network-quality A/V Stream. In doing so, it is not necessary to share the A/V stream over the a networks, such as the Internet. Piracy may be accomplished by sharing a descrambling key, such as a NCW, which typically is comprises a very small amount of data that is easily transmittable over networks. In the architecture of FIG. 2, the descrambling key, e.g., a NCW, is inherently more vulnerable to such attacks because it is exported from the smart card.

Figure 3:
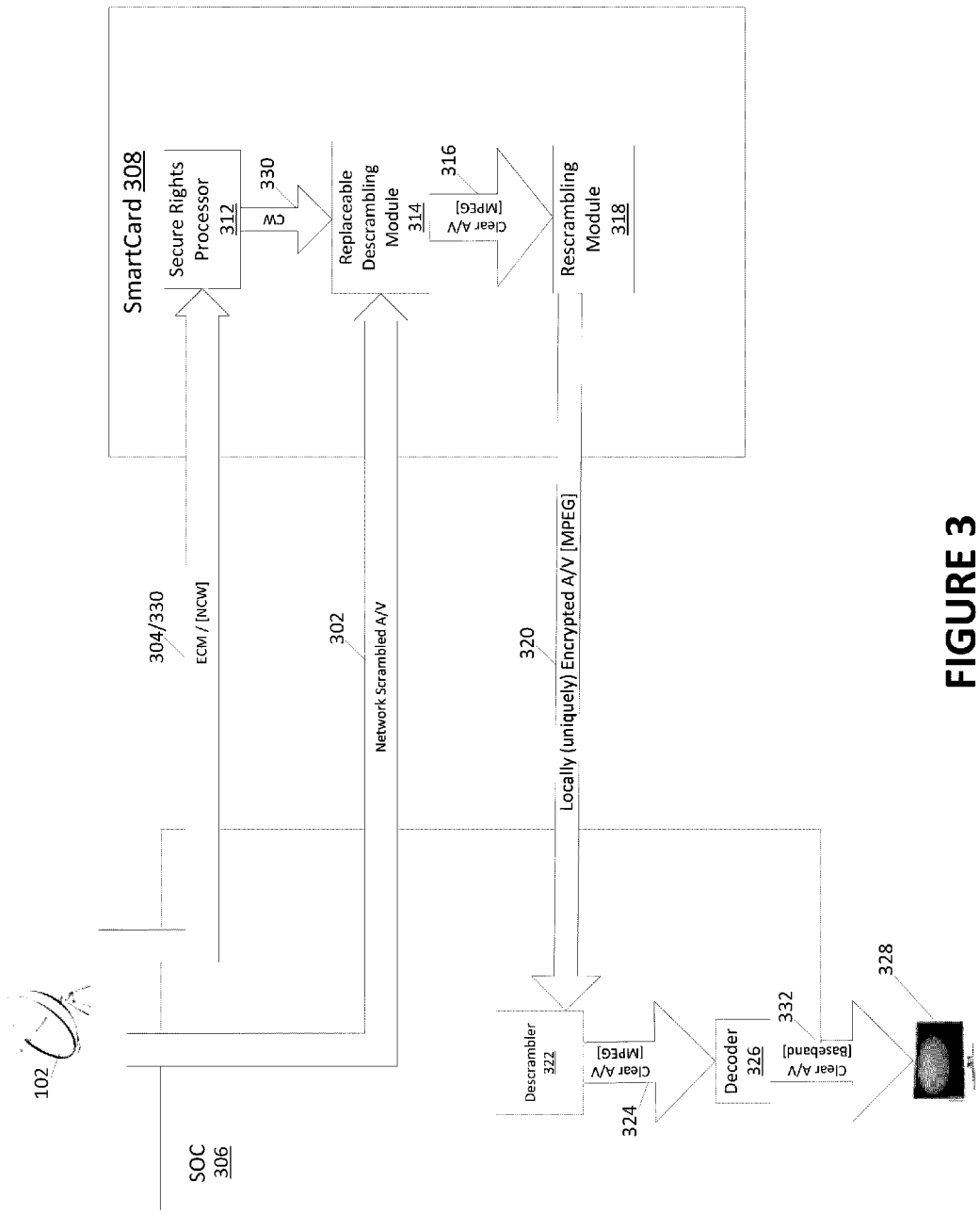
FIG. 3 illustrates another implementation of audio visual descrambling in a set-top box.

An improved architecture is shown in FIG. 3. In this figure, one or more scrambled A/V streams 302 and ECM stream(s) 304 are routed from the SoC 306 to the smart card 308. The smart card 308 performs secure processing and extracts or computes the NCW 330. A scrambled A/V stream 302 is first descrambled 314 in the smart card 308, e.g., using a network descrambling algorithm and the NCW 330. The result is an A/V stream 316 in the clear (e.g., not encrypted), although still compressed. The smart card 308 may generate a random Local Control Word and uses this value to re-scramble 318 the A/V using a local scrambling algorithm. The re-scrambled A/V 320 and the LCW may be returned to the SoC 306. The SoC 306 may then use the Local Control Word to descramble 322 the locally (e.g., uniquely) encrypted A/V 320. The descrambled A/V stream 324 can then be decoded by a decoder 326 and transmitted to a display, such as but not limited to, a TV 328 as a clear A/V baseband stream 332.

In the architecture depicted with regard to FIG. 3, the smart card 308 and the SoC 306 may communicate via a Super Packet Transport Stream. In an embodiment, a Super Packet Transport Stream comprises an extension of a standard MPEG transport stream. In further embodiments, a Super Packet may have a fixed length of 212 bytes.

In embodiments described below, C&C data may comprise part of an overall Super Packet Transport Stream shared between a smart card and a SoC. As discussed above, C&C data typically includes descrambling and settings information, such as ECMs and EMMs. The command and control data is communicated in a command and control packet. As will be discussed further below, the command and control packet may be segmented and inserted as header information to be sent from the SoC to the smart card.

Figure 4A:
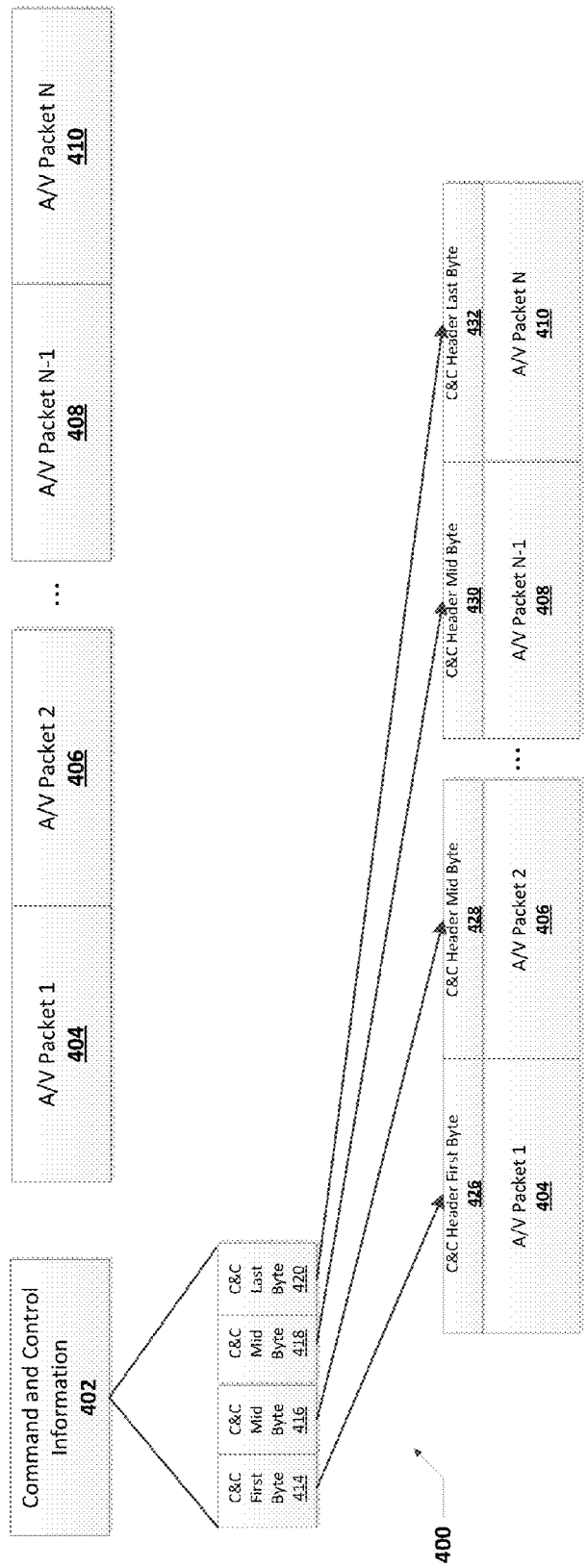
FIG. 4A depicts assembly of a Super Packet Transport Stream with command and control data in the headers.

FIG. 4A depicts assembly of a Super Packet Transport Stream with command and control data in the headers. The SoC receives A/V information from a head-end as a sequence of A/V Packets 404-410. In embodiments, the A/V information may be comprised of an MPEG Transport Stream ("TS") comprised of TS Packets. The SoC may also receive command and control data from the head-end. In embodiments, the command and control data from the head-end may be carried in MPEG TS packets. Furthermore, the SoC itself may locally generate command and control data. Command and control data, regardless of source, is formatted into a command and control packet 402.

As is shown in FIG. 4A, the command and control packet may be divided into multiple command and control segments 414-420. Each command and control segment 414-420 contains a portion of the information in the command and control packet 402. In embodiments of the present disclosure, each segment of the command and control packet is a fixed portion of a packet structure, such as an audio/visual packet (e.g., A/V Packets 404-408). For example, in one embodiment, the command and control segment is one byte. However, other segment sizes are contemplated within the scope of the present disclosure.

Each command and control segment 414-420 is accompanied by a command and control flag. In embodiments, the command and control flag can be one of four values: "First portion," "Middle portion," "Last portion," or "Null Byte." The First portion, Middle portion, and Last portion Flags are all associated with a header that contains valid command and control data. A Null Byte flag is associated with a header that may include extraneous or false (e.g., dummy or stuffing) command and control data and may be ignored. As can be appreciated, the command and control flags identify the boundaries of the command and control packets.

In an embodiment, the command and control segments 414-420 may be inserted along with the command and control flag into the headers of the A/V packets of the Super Packet Transport Stream. As is shown in FIG. 4A, the command and control First portion header 426 may be inserted into the header of A/V Packet 1 404, the command and control Middle portion header 428 may be inserted into the header of A/V Packet 2 406, the command and control Middle portion header 430 may be inserted into the header of A/V Packet N−1 408, and the command and control Last portion header 432 may be inserted into the header of A/V Packet N 410. This assembled Super Packet Transport Stream may then be exchanged between the SoC and the smart card.

FIG. 4B depicts re-assembly of command and control data from the Super Packet Transport Stream. In an embodiment, upon receipt of the Super Packet Transport Stream, the receiver may extract the command and control data 426-432 and reassemble the command and control packet. The receiver may then save the command and control data 438, such as the ECM and the EMM, to the command and control buffer. This information may be stored until new command and control data—and therefore, new command and control data, is received. Reassembly of the command and control packet will be discussed in further detail in FIG. 5.

Further to this embodiment, when the smart card sends Super Packet Transport Streams back to the SoC, the smart card may assemble command and control data in the headers as described with reference to FIG. 4A. The smart card inserts command and control data, such as a local control word, into the command and control data and sends the Super Packet Transport Stream to the SoC. The SoC reassembles the command and control data as shown in FIG. 4B, and as described in further detail in FIG. 5 below.

Figure 5:
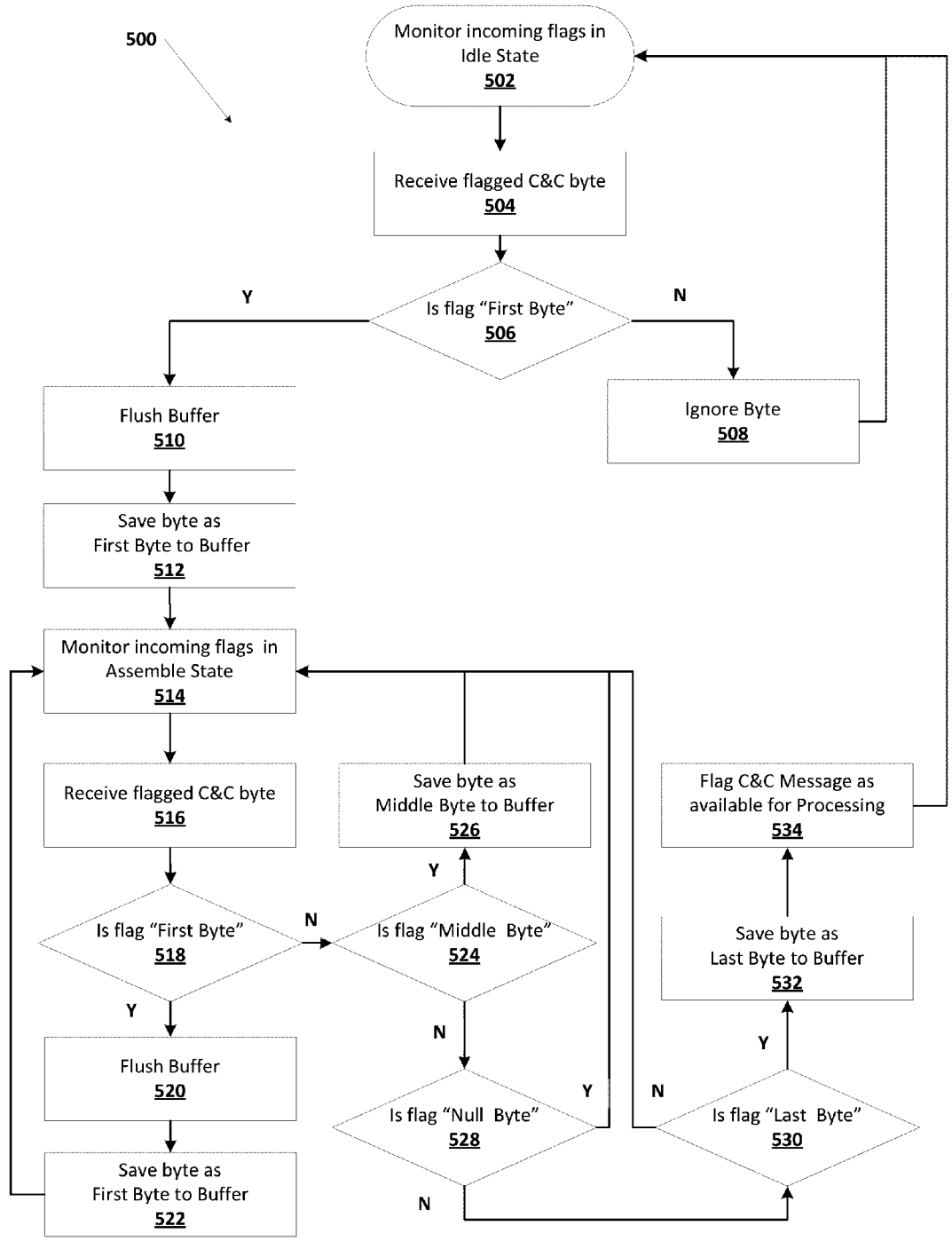
FIG. 5 illustrates a method for extracting command and control data.

FIG. 5 depicts an exemplary method 500 for reassembling a command and control packet from command and control data. The method 500 is discussed as performed by the smart card. However, performance at other devices, such as the set-top box or another removable security element, is contemplated within the scope of the present disclosure. For example, when a SoC receives a Super Packet Transport Stream back from the smart card, a SoC may reassemble the command and control packet using method 500 discussed below.

Method 500 commences at monitor operation 502. At monitor operation 502, the smart card may receive Super Packet Transport Streams in an idle state. The smart card monitors the headers of the Super Packet Transport Streams, looking at the C&C flag value. The smart card remains in monitor operation 502, until a C&C flag value is detected. When a C&C flag is detected at detect operation 504, the smart card proceeds to determine operation 506.

At determine operation 506, the smart card determines whether the flag is a First portion flag. For purposes of this description, determining the identity of a flag may comprise processing the command and control ID flag associated with a header. If the flag is not a First portion flag, the smart card ignores the byte at operation 508. In an embodiment, upon ignoring the byte at operation 508, the smart card may acknowledge that the byte may have been flagged in error. Once the byte has been ignored, flow returns to monitor operation 502.

If the flag is a First portion flag, flow proceeds to flush buffer operation 510. In embodiments described by the present disclosure, command and control data is stored in the buffer at the smart card. When the First portion flag is received, the smart card recognizes that new command and control data is being transmitted. The smart card flushes the buffer to clear the old command and control data while at the same time creating space for the new command and control data. In embodiments, flushing the buffer may comprise filling the buffer with all zeros and setting the byte count to zero. Flow then proceeds to save operation 512.

At save operation 512, the smart card stores the command and control data in the First portion command and control header to the buffer. At this point the smart card transitions to an assemble state and continues to monitor incoming headers at monitor operation 514. The smart card continues to monitor incoming headers of the Super Packet Transport Stream until another flagged byte is received at receive operation 516. Flow then proceeds to operation 518.

At determine operation 518, the smart card determines whether the received byte is a First portion flag. If the received byte is a First portion flag, flow proceeds to operation 520. If the received byte is not a First portion flag, flow proceeds to operation 524.

At operation 520, the smart card flushes the buffer. At this time, the buffer is currently storing the command and control data associated with the flagged "First portion" header saved at operation 512. In an embodiment, as a second First portion flag has been received before a Last portion flag, the smart card may assume that the original First portion header was flagged in error and flushes the buffer of the command and control data associated with it. At operation 522, the smart card stores the new First portion header command and control data to the buffer. Flow then proceeds back to monitor operation 514.

At operation 524, the smart card determines whether the flag is a Middle portion flag. Upon determining that the flag is a Middle portion flag, flow proceeds to operation 526. Upon determining that the flag is not a Middle portion flag, flow proceeds to operation 528.

At operation 526, the smart card saves the command and control data associated with the Middle portion flag to the buffer. In embodiments, saving to the buffer may comprise appending the command and control data associated with a previous Middle portion flag(s) to the already stored command and control data associated with the First portion flag. Once the command and control data is saved to the buffer, flow proceeds back to monitor operation 514.

At operation 528, the smart card determines whether the flag is a Null Byte flag. As described above, the Null Byte flag is associated with a header that does not include any, or at least any viable, command and control data. If a Null Byte flag is identified at operation 528, the smart card ignores the data and continues to monitor the Super Packet Transport Stream at operation 514. If the flag is not a Null Byte flag, flow proceeds to operation 530.

At operation 530, the smart card determines whether the flag is a Last portion flag. If the flag is not a Last portion flag then it is a flag that does not indicate command and control data. As such, the smart card ignores it and returns to monitor operation 514.

If the flag is a Last portion flag, the smart card saves the command and control data associated with the Last portion flag to buffer at operation 532. Once the command and control data is saved, flow proceeds to operation 534.

At operation 534, the smart card marks the saved command and control data in the buffer as ready to process. In embodiments, processing the command and control data may comprise executing the command. Once the command and control data has been marked, flow returns to monitor operation 502.

Figure 6:
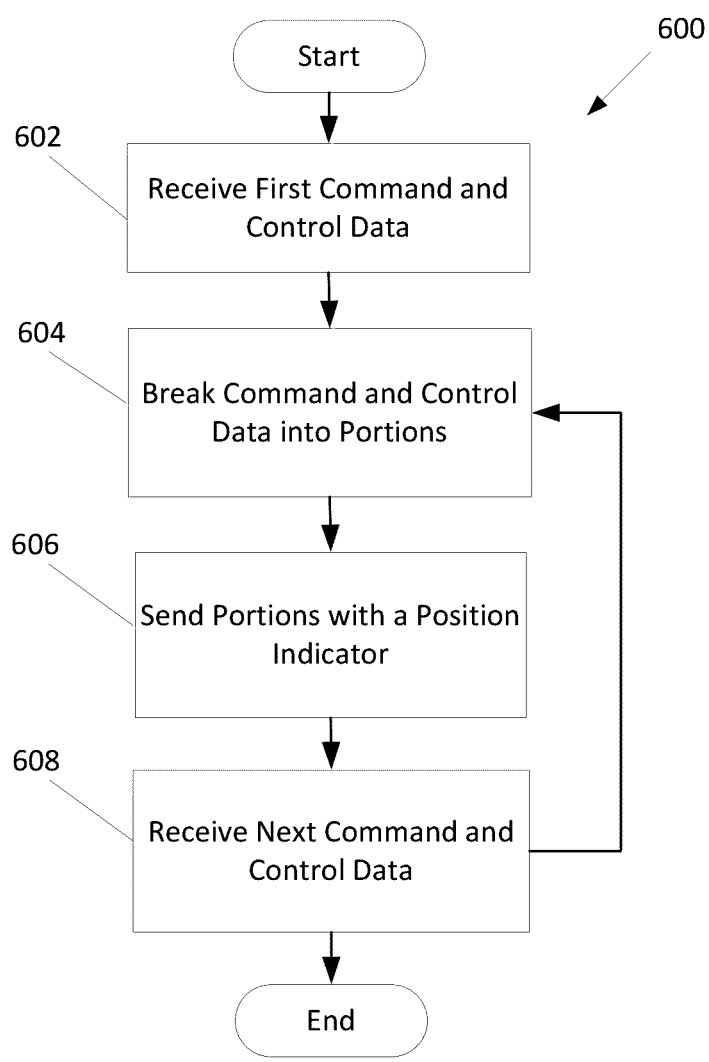
FIG. 6 depicts an embodiment of a method for breaking command and control data into individual portions.

FIG. 6 depicts an embodiment of a method 600 for breaking command and control data into individual portions that may be sent using out of band communications with audio/visual data or other types of data. Flow begins at operation 602 where a first portion of command and control data is received by a device performing the method 600. In embodiments, such a device may be a set-top-box, a video processing device, a general computing device, or any other type of device capable of receiving and/or generating command and control data and sending command and control data using out of band communications. In one embodiment, the command and control data may be received from an external source. For example, the command and control data may be received in an EMM or ECM that is part of broadcast transmission. In other embodiments, the command and control data may be generated by the device performing the method 600. For example, the device performing the method 600 may generate command and control data to send to another device, such as a secure processor, a SoC, and/or a smart card.

After receiving and/or generating command and control, flow continues to operation 604 where the command and control data is broken multiple individual portions. In embodiments, the size of each portion may depend upon a particular communications protocol, a specific packet size of a header, the type of other data being transmitted (e.g., audio and/or visual data), or any other requirement. In one embodiment, the command and control data may be broken into byte sized portions. In other embodiments, the command and control data may be broken into larger portions consisting of multiple bytes or into smaller portions consisting of one or more bits. One of skill in the art will appreciate that the size and number of individual portions of command and control data created at operation 604 may vary without departing from the spirit of this disclosure.

Flow continues to operation 606 where the individual portions of data created in operation 604 are sent to another device, such as a secure processor, a smart card, a SoC, or any other type of computing device. In embodiments, the individual portions are sent utilizing out of band communication along with the other type of data being transmitted. For example, the portions may be sent as part of one or more headers associated with audio and/or visual data. In embodiments, the portions sent at operation 606 may be sent with an indicator used to indicate a portion's position in a completed reconstruction of the command and control data. In one embodiment, four types of indicators may be used. A "First portion" flag indicating a first portion of command and control data, a "Middle Portion" flag indicating that the portion is a middle portion of a command and control flag, a "Last Portion" flag indicating the last portion of command and control data, and a "Null Portion" flag indicating that no command and control data is present. In such embodiments, only one portion may be identified by the "First portion" flag and "Last Portion" flag for all of the portions that constitute the broken up command and control data; however, one or multiple portions may be identified using the "Middle Portion" flag. In another embodiment, the portions may be identified using a sequential identifier that corresponds to the order of the portions to be used to reconstruct the command and control data. In such embodiments, an additional indicator may be used to relay the total number of portions that comprise the command and control data.

After the portions of command and control data created at operation 604 are sent at operation 606, flow continues to operation 608 where the next command and control data is received and/or generated by the device performing the method 600. Flow continues back to operation 604 and the method 600 is repeated until there is no additional command and control data.

Figure 7:
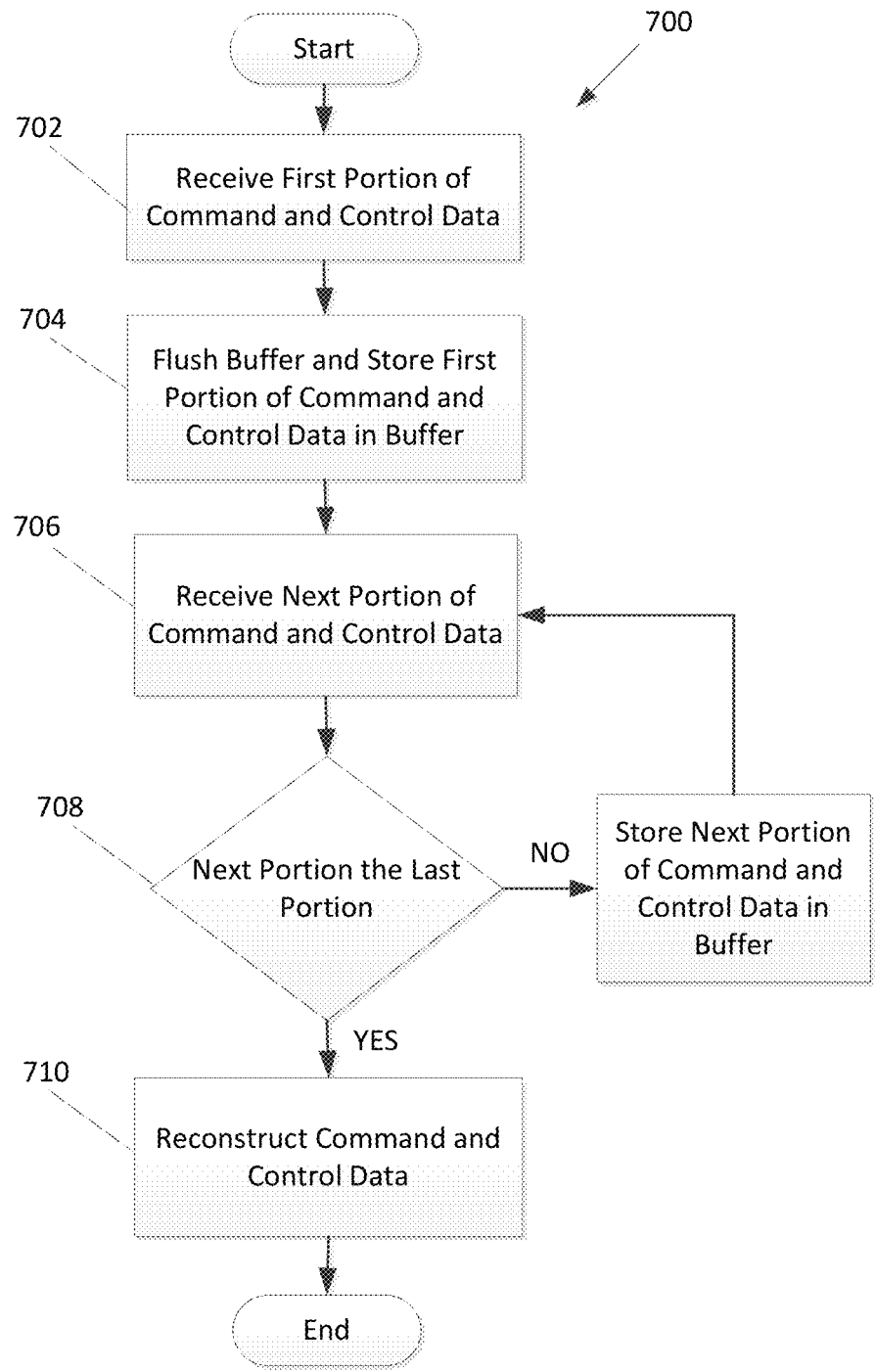
FIG. 7 depicts an embodiment of a method for reconstructing command and control data.

FIG. 7 depicts an embodiment of a method 700 for reconstructing command and control data sent in out of band communication. For example, multiple portions of command and control data may be sent in out of band communication, e.g., as part of a header for audio and/or visual data or as another component of audio/visual data transmission. In embodiments, a smart card, a secure processor, a SoC, or any other type of processing device may perform the method 700. Flow begins at operation 702 where a first portion of command and control data is received. In embodiment, the first portion is identified by an indicator, such as a "First portion" indicator; however, other types of indicators may be used without departing from the scope of this disclosure. In another embodiment, the first portion of command and control data may be determined by examining a buffer and determining that no other command and control data resides in the buffer. As such, one of skill in the art will appreciate that the a portion of command and control data may be determined as being the first portion without the use of an indicator while remaining within the scope of the present disclosure.

Flow continues to operation 704 where, upon receiving a first portion of command and control data, a buffer is flushed to clear out any data remaining in the buffer. Having flushed the buffer, the first portion of command and control data is then stored in the buffer. Flow continues to operation 706 where a next portion of command and control data is received. In embodiments, a next portion of command and control data is any command and control data following the first portion of command in control data. In one embodiment, the next portion of command and control data may be indicated by any type of indicator other that the "First portion" indicator, such as, for example, a "Middle Portion" or "Last Portion" indicator. In other embodiments, other indicators, such as a sequential identifier, may be used to identify the next portion of command and control data. In yet another alternate embodiment, the next portion of command and control data may not be accompanied by an indicator.

Upon receiving the next portion of command and control data, flow continues to operation 708 where a determination is made as to whether the next portion of command and control data is the last portion of the command and control data. In one embodiment, the determination may be based upon receiving a "Last Portion" flag or indicator along with the next portion of command and control data received at operation 706. In another embodiment, the next command and control data may be identified as the last portion by another indicator, or by making a determination based on the number of portions of command and control data previously received. For example, if the command and control data has a known size, a determination that the next received portion of command and control data is the last portion of command and control data by determining the amount of data received in each portion of command and control data and comparing the total amount of data received to a known size of data.

If the next portion of command and control data is not the last portion of data, flow branches NO to operation 712 and the next portion of command and control data received at operation 706 is stored in the buffer. Flow then returns to operation 706 where the next portion of command and control data is received and continues in a loop until the last portion of command and control data is received.

When a determination is made that the last portion of command and control data is received at operation 708 flow branches YES to operation 710 where the last portion of command and control data is placed in the buffer and the command and control data is reconstructed. In one embodiment, the command and control data may be reconstructed as it is each individual portion is received and placed into the buffer. The reconstructed command and control data is then provided and/or operated upon by pulling the data out of the command and control buffer. In another embodiment, the additional processing may be required to reconstruct the command and control data. For example, reordering of the individual portions stored in the buffer may be performed at operation 710, additional information may be added to the individual portions stored in the buffer, or other types of processing may be performed at operation 710 to reconstruct command and control data. One of skill in the art will appreciate that any method of reconstructing portions of data into a completed data set may be employed at operation 710 without departing from the scope of the present disclosure.

Figure 8:
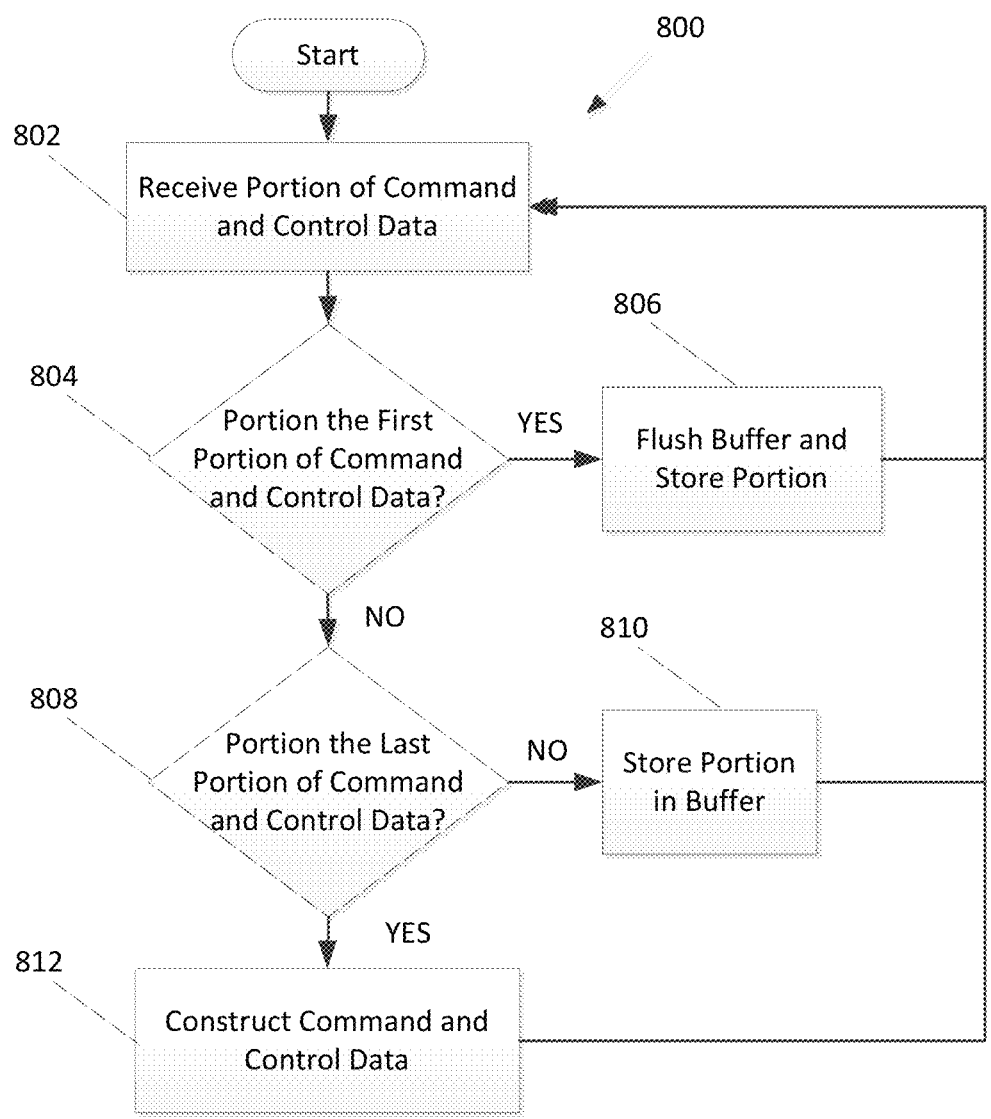
FIG. 8 depicts yet another embodiment of a method for reconstructing command and control data.

FIG. 8 depicts yet another embodiment of a method 800 for reconstructing command and control data sent in out of band communication. For example, multiple portions of command and control data may be sent in out of band communication, e.g., as part of a header for audio and/or visual data or as another component of audio/visual data transmission. In embodiments, a smart card, a secure processor, a SoC, or any other type of processing device may perform the method 800. Flow begins at operation 802 where a first portion of command and control data is received. In embodiment, the first portion is identified by an indicator, such as a "First portion" indicator; however, other types of indicators may be used without departing from the scope of this disclosure. In another embodiment, the first portion of command and control data may be determined by examining a buffer and determining that no other command and control data resides in the buffer. As such, one of skill in the art will appreciate that the a portion of command and control data may be determined as being the first portion without the use of an indicator while remaining within the scope of the present disclosure.

Flow continues to operation 804 where a determination is made as to whether the portion of command and control data received at operation 802 is the first portion of command and control data. For example, the various exemplary methods described with respect to FIG. 7 may be employed at operation 804 to determine whether the received portion is the first portion of command and control data. If the received portion is the first portion, flow branches YES to operation 806 where a buffer for storing the command and control data is flushed and the received portion of command and control data is stored in the buffer. Flow then returns to operation 802 and another portion of command and control data is received.

If the portion received is not the first portion of command and control data, flow branches NO from operation 804 to operation 808 and a determination is made as to whether the received portion is the last portion of command and control data. The various exemplary methods described with respect to FIG. 7 may be employed at operation 808 to determine whether the received portion is the last portion of command and control data. If the received portion is not the last portion of command and control data, flow branches NO to operation 810 where the portion is stored in the buffer and flow returns to operation 802.

If the portion received is the last portion of command and control data, flow branches YES from operation 808 to operation 812 where the last portion of command and control data is placed in the buffer and the command and control data is reconstructed. In one embodiment, the command and control data may be reconstructed as it is each individual portion is received and placed into the buffer. The reconstructed command and control data is then provided and/or operated upon by pulling the data out of the command and control buffer. In another embodiment, the additional processing may be required to reconstruct the command and control data. For example, reordering of the individual portions stored in the buffer may be performed at operation 812, additional information may be added to the individual portions stored in the buffer, or other types of processing may be performed at operation 812 to reconstruct command and control data. One of skill in the art will appreciate that any method of reconstructing portions of data into a completed data set may be employed at operation 812 without departing from the scope of the present disclosure.

Figure 9:
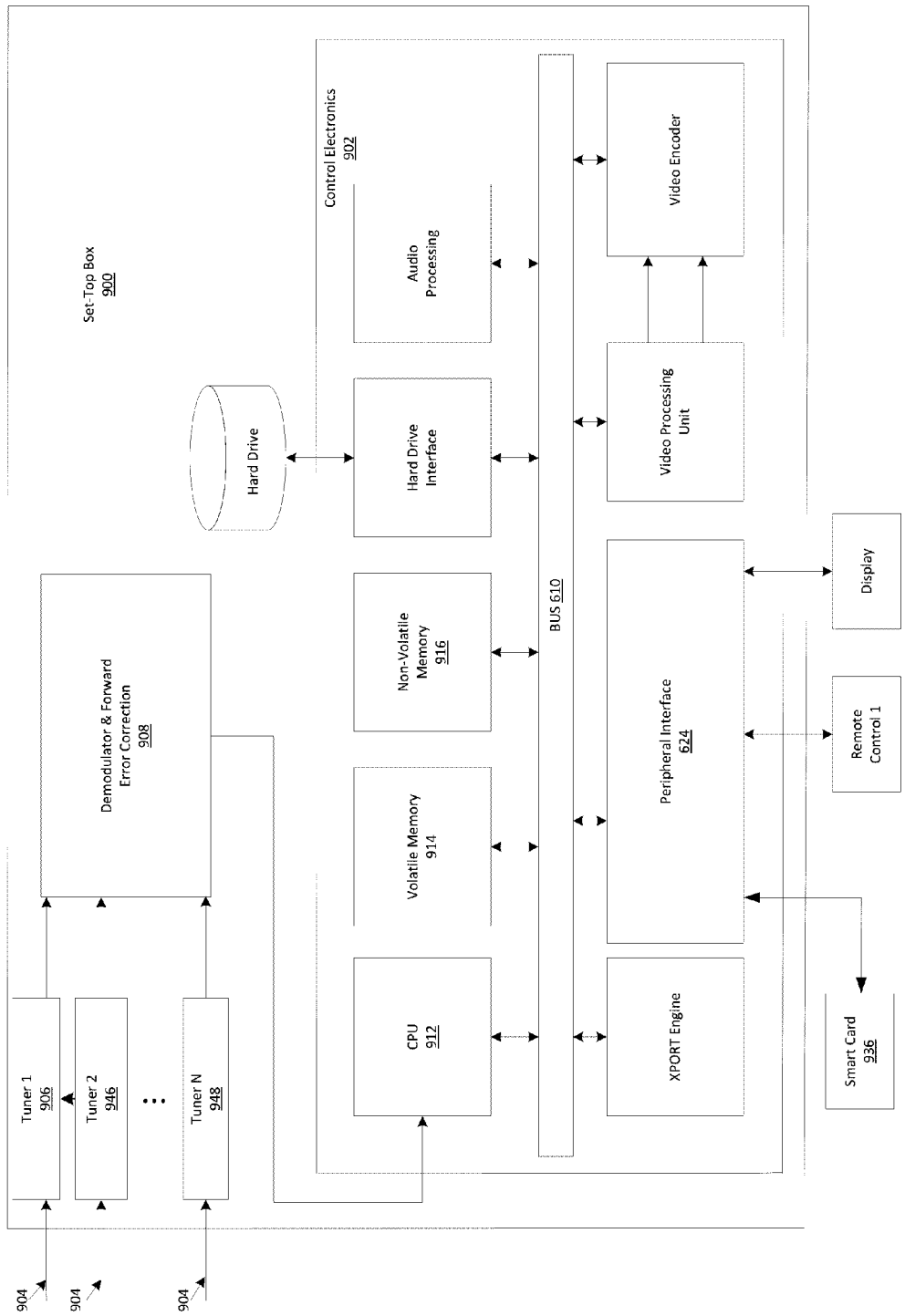
FIG. 9 depicts an exemplary set-top box for assembling and extracting command and control data.

FIG. 9 depicts an exemplary set-top box 900 for assembling and extracting command and control data and described with reference to FIGS. 4, 5, 6, 7, and 8. While FIG. 9 is illustrated with various components that are explained therein, some other components are known to the art and do not need explanation.

Set-top box 900 includes Control electronics unit (not pictured) that may contain one or more central-processing-units (CPUs) or processors. The CPUs may be housed on a SoC, such as SoC 902. In this embodiment, control electronics unit contains a single CPU that is operatively connected to the shared bus. In this embodiment, CPU may be used, among other things, for logical operations for set-top box functions including, but not limited to, channel selection, recording control, EPG display and control and system maintenance. One skilled in the art will recognize that the CPU may be integrated with memory or other discrete electronics components. In embodiments, CPU may be used to perform the systems and methods disclosed herein.

Control electronics unit may contain one or more volatile memory components. Volatile memory components may include, but are not limited to, one or more SDRAM memory chips. Similarly, control electronics unit may also contain one or more non-volatile memory components. Non-volatile memory may include one or more memory chips, including, but not limited to, ROM, SRAM, SDRAM and Flash. One skilled in the art will recognize that volatile memory and non-volatile memory may be integrated within other electronics components. One skilled in the art will also recognize that other memory components may be included within set-top box 900 and control electronics unit. One skilled in the art will recognize that memory, may be used for many purposes, including, but not limited to, storing EPG data and storing data for use by CPU. In embodiments, the Volatile memory components and/or one or more non-volatile memory components may be used to store the executable instructions to perform the method 500. In addition, the Volatile memory components may be used to store the extracted command and control header segments as described with respect to FIG. 5.

A set-top box 900 may be connected to one or more peripheral electronic devices through peripheral interface. These peripheral devices may include a smart card 936. In embodiments, the smart card 936 may extract command and control data from a header of a Super Packet in a Super Packet Transport Stream. In such embodiments, the smart card 936 performs the method 500 disclosed herein.

Incoming data 904 9 9 from transport inputs, such as head-end described with respect to FIG. 1, are routed to the Transport Demodulator 9608, a smart card 936, or both. The smart card may identify at PID Filters 912, 914, and 916 whether a packet identifier (PID) associated with a packet indicates that the packet contains A/V information intended for the smart card 936. In one embodiment, the PID filters 912, 914, and 916 support up to 32 PIDs per transport input. In other embodiments, the PID Filters 912, 914, and 916 are aggregated into a pool of 256 PIDs for all transport inputs. Packets with such PIDS are sent to super packet mux where the A/V packets are multiplexed together into a Super Packet Transport Stream. DMA inputs may also be added to the Super Packet Transport Stream.

Packet Extension and stuffing packets may also be added to create the Super Packet Transport Stream. The Packet Extension may include additional data for stream identification, stream type, command and control field, and encryption flags. Stuffing Packets are inserted into the stream in order to maintain a constant bit rate. Command and control 924 information may also be added to the Super Packet Transport Stream. As shown in FIG. 4, the command and control data may be segmented and inserted into one or more headers for a Super Packet Transport Stream.

The Super Packet Transport Stream is sent to a smart card 636 for Network Decryption. After the Network Decryption, PIDs of interest are re-encrypted using Local Link Encryption and then muxed with regenerated stuffing packets into a single Super Packet Transport Stream for return to SoC 902. The command and control data sent by the SoC 902 in the Super Packet Transport Stream headers is removed as discussed in FIG. 5. The command and control data is replaced, in the return Super Packet Transport Stream by command and control data to be sent to the SoC 902. In embodiments, the return command and control data may include a local control word as discussed with reference to FIG. 3. The return command and control data exists and is processed for all packets, including stuffing packets and A/V packets. The smart card 936 may also remove and add packets to the Super Packet Transport Stream as it passes through the smart card 936.

When the Super Packet Transport Stream is returned from the smart card 936, the SoC 902 will perform the reverse operations described previously. The command and control data is extracted 628, the Stuffing Packets are removed 926, the A/V content is locally decrypted 630 and the multiplexed stream is broken back into separate MPEG2 Transport Streams that are delivered to the Transport Demux 910. The Transport Demux 910 also utilizes PIDs from the original transport streams 904, 906, and 908 that may not have been delivered to the smart card 936. Valid (non-null) command and control data in the Super Packet header is separated from the Super Packet header and delivered to memory. Bulk data that is not MPEG transport formatted 934 is also removed and delivered to memory.

Figure 10:
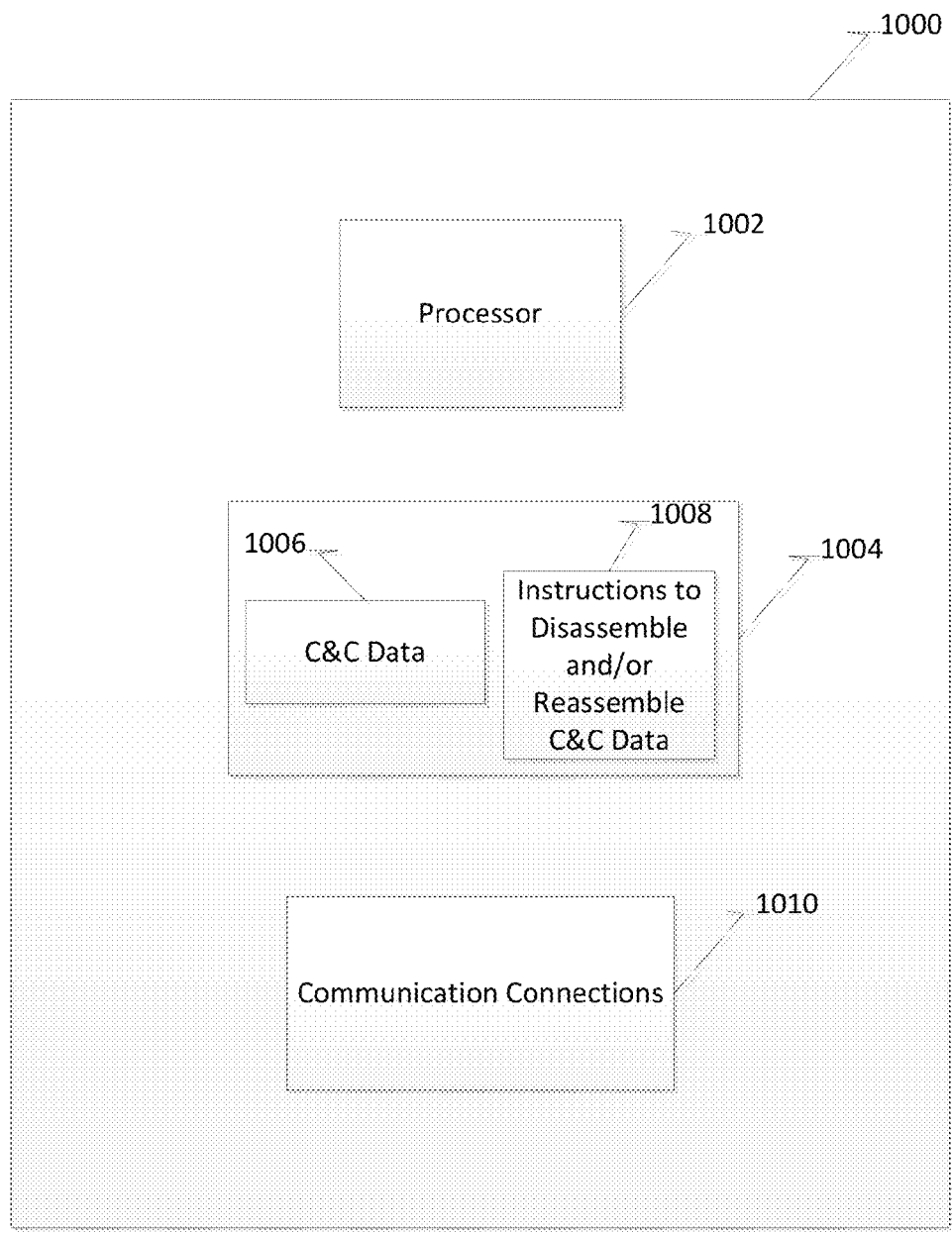
FIG. 10 is an embodiment of a secure processing device that may be employed with the systems or to perform the methods disclosed herein.

FIG. 10 is an embodiment of a secure processing device 1000 that may be employed with the systems or to perform the methods disclosed herein. In embodiments, the secure processing device may be a smart card. However, one of skill in the art will appreciate that any other type of secure device may be employed with the systems and methods disclosed herein. In embodiments, the secure processing device may be part of a device performing the methods described herein. In another embodiment, the secure processing device 1000 may be a removable component of a device performing the method described herein.

In embodiments, secure processing device 1000 includes one or more processing units 1002. In some embodiments, one or more components of the methods described herein are performed by the one or more processing units 1002. For example, the one or more processing units 1002 may be used to reassemble command and control data as described herein.

Secure processing device 1000 may also include memory 1004. Memory 1004 includes, but is not limited to, RAM, ROM, EEPROM, flash memory or other memory technology, or any other tangible medium which is used to store information and which is accessed by secure processing device 1000 and one or more processing units 1002. Memory 1004 may store executable instructions to perform the methods disclosed herein. For example, memory 1004 may include instructions to decrypt network encrypted content (NEC) 1006. Memory may also store the instructions to encrypt clear content to create locally encrypted content (LEC) 1008.

Secure processing device 1000 may also contain communications connection(s) 1010 that allow the device to communicate with other devices. Communication connection(s) 1010 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In embodiments, network encrypted content such may be received over communications connection(s) 1010. Locally encrypted content may be transmitted over communications connection(s) 1010. In still further embodiments, the instructions to perform the Transport I/O methods described herein may be received via communications connection(s) 1010. For example, a head-end may update secure processing device 1000 with instructions to perform the methods disclosed herein. The instructions may be stored in memory 1004. Communications connection(s) 1010 thereby allows a head-end to update smart cards deployed in the field with instructions to perform the methods herein. Communications connections also provide the secure processing device 1000 with the ability to receive network encrypted content from a device and return locally encrypted content to the device.

Although the embodiment of the secure processing device 1000 is illustrated as having memory 1004 that includes instructions to perform the methods disclosed herein, in alternate embodiments, the instructions to perform the methods disclosed herein may be performed by an application specific integrated circuit (ASIC) that is part of the secure processing device 1000.

Figure 11:
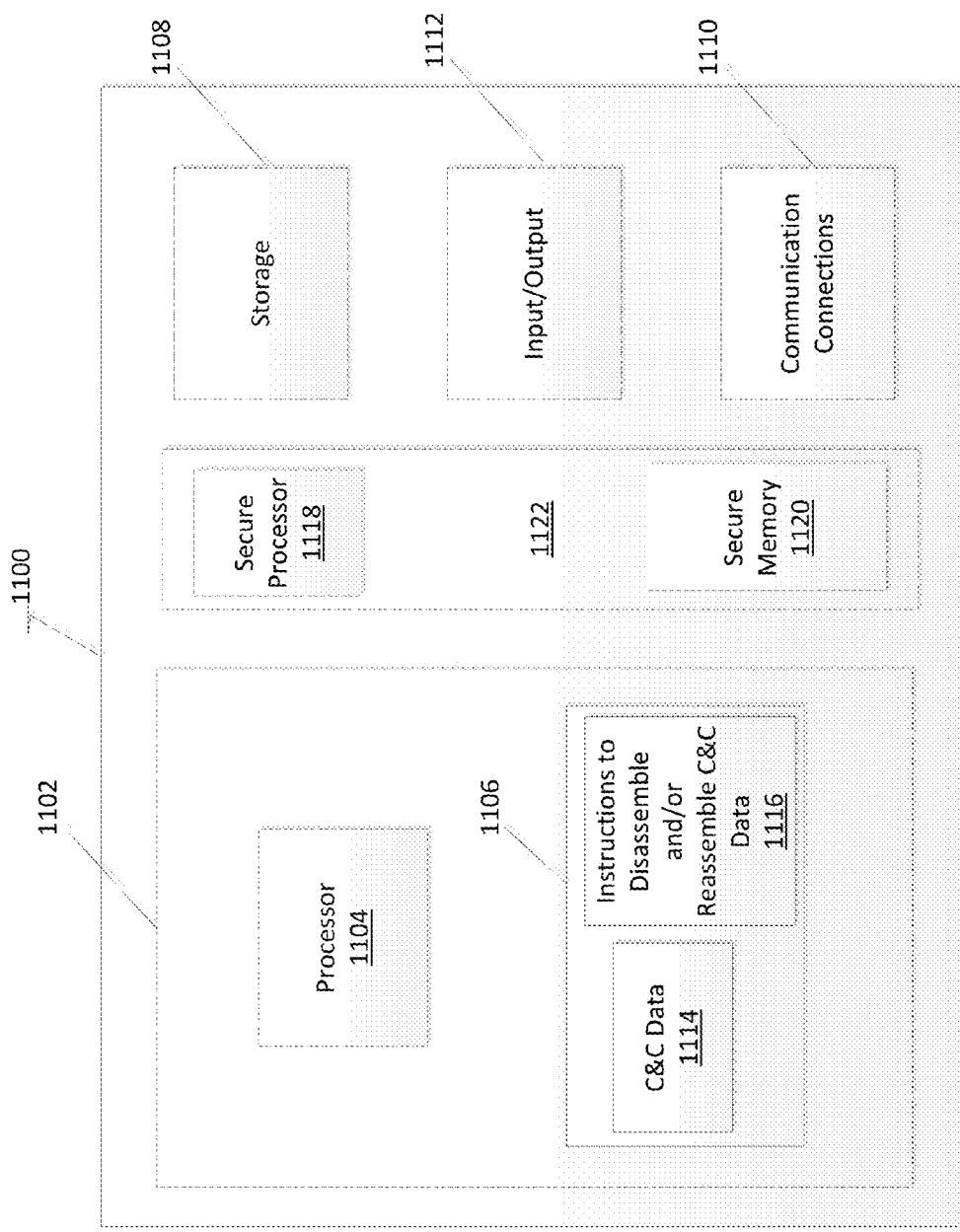
FIG. 11 depicts an embodiment of a computing environment for implementing the various embodiments described herein.

With reference to FIG. 11, an embodiment of a computing environment for implementing the various embodiments described herein includes a computer system, such as computer system 1100. Any and all components of the described embodiments (such as the DVR, the content storage server, a laptop, mobile device, personal computer, a smart phone, a secure processing device, etc.). may execute as or on a client computer system, a server computer system, a combination of client and server computer systems, a handheld device, and other possible computing environments or systems described herein. As such, a basic computer system applicable to all these environments is described hereinafter.

In its most basic configuration, computer system 1100 comprises at least one processing unit or processor 1104 and system memory 1106. The most basic configuration of the computer system 1100 is illustrated in FIG. 11 by dashed line 1102. In some embodiments, one or more components of the described system are loaded into system memory 1106 and executed by the processing unit 1104 from system memory 1106. Depending on the exact configuration and type of computer system 1100, system memory 1106 may be volatile (such as RAM), non-volatile (such as ROM, flash memory, etc.), or some combination of the two.

Additionally, computer system 1100 may also have additional features/functionality. For example, computer system 1100 may include additional storage media 1108, such as removable and/or non-removable storage, including, but not limited to, magnetic or optical disks or tape or solid state storage. In some embodiments, software or executable code and any data used for the described system is permanently stored in storage media 1108. Storage media 1108 includes volatile and non-volatile, removable and non-removable media implemented in any method or technology for storage of information such as computer readable instructions, data structures, program modules, or other data.

System memory 1106 and storage media 1108 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, solid state storage or any other tangible medium which is used to store the desired information and which is accessed by computer system 1100 and processor 1104. Any such computer storage media may be part of computer system 1100. In some embodiments, system memory 1106 and/or storage media 1108 may store data used to perform the methods or form the system(s) disclosed herein. In other embodiments, system memory 1106 may store information such as the command and control data 1114 and logic 1116 to perform the methods of breaking and reassembling command and control data described herein.

Computer system 1100 may also contain communications connection(s) 1110 that allow the device to communicate with other devices. Communication connection(s) 1110 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In an embodiment, content and metadata may be transmitted over communications connection(s) 1110.

In some embodiments, computer system 1100 also includes input and output connections 1112, and interfaces and peripheral devices, such as a graphical user interface. Input device(s) are also referred to as user interface selection devices and include, but are not limited to, a keyboard, a mouse, a pen, a voice input device, a touch input device, etc. Output device(s) are also referred to as displays and include, but are not limited to, cathode ray tube displays, plasma screen displays, liquid crystal screen displays, speakers, printers, etc. These devices, either individually or in combination, connected to input and output connections 1112 are used to display the information as described herein. All these devices are well known in the art and need not be discussed at length here. In further embodiments, the input and output connections 1112 may be used to communicate with a removable secure processor, such as, but not limited to, a smart card or a removable secure device.

In further embodiments, computer system 1100 may include a secure processor 1118 and secure memory 1120 that may be used to perform some of the methods disclosed herein. In embodiments, the secure processor 1118 and secure memory 1120 of the computer system 1100 may comprise a secure area 1122 that is not generally accessible by the other components of computer system 1100 or by other processes executing on the computer system 1100. In embodiments, secure memory may store instructions to reassemble command and control data as described herein. Such instructions may be executed by the secure processor 1118.

In some embodiments, the components described herein comprise such modules or instructions executable by computer system 1100 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 1100 is part of a network that stores data in remote storage media for use by the computer system 1100.

This disclosure described some embodiments of the present invention with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments were described herein, the scope of the invention is not limited to those specific embodiments. One skilled in the art will recognize other embodiments or improvements that are within the scope and spirit of the present invention. Therefore, the specific structure, acts, or media are disclosed only as illustrative embodiments. The scope of the invention is defined by the following claims and any equivalents therein.

What is claimed is:

1. A method for reassembling a command and control packet, the method comprising:
    receiving a portion of a command and control packet, wherein the portion of the command and control packet is received in a header of an audio visual (A/V) packet;
    determining whether the portion of command and control packet is a first portion of command and control packet; and
    when the portion of command and control packet is the first portion of command and control packet, flushing a buffer and storing the first portion of command and control packet in the buffer.

2. The method of claim 1, wherein the determination of whether the portion of command and control packet is the first portion of command and control packet is based upon a first portion flag associated with the portion of command and control packet.

3. The method of claim 1, further comprising:
    receiving a next portion of command and control packet; and
    determining whether the next portion of command and control packet is a last portion of packet.

4. The method of claim 3, further comprising when the next portion of command and control packet is not the last portion of the command and control packet, storing the next portion of command and control packet in the buffer.

5. The method of claim 4, wherein the determination is made that the next portion of command and control packet is not the last portion of command and control packet based upon the presence of a middle portion flag.

6. The method of claim 3, further comprising when the next portion of command and control packet is the last portion of command and control packet, reassembling the command and control packet.

7. The method of claim 6, further comprising executing the command and control packet.

8. The method of claim 6, wherein the determination is made that the next portion of command and control packet is not the last portion of command and control packet based upon the presence of a middle portion flag.

9. The method of claim 1, further comprising when the portion of command and control packet is not the first portion of command and control packet, determining whether the portion of command and control packet is the last portion of command and control packet.

10. The method of claim 9, further comprising when the portion of command and control packet is not the last portion of command and control packet, storing the portion of command and control packet in the buffer.

11. The method of claim 9, further comprising when the portion of command and control packet is the last portion of command and control packet, reassembling the command and control packet.

12. A non-transitory computer storage medium encoding computer executable instruction that, when executed by at least one processor, perform a method for reassembling a command and control packet, the method comprising:
    receiving a portion of a command and control packet, wherein the portion of the command control packet is received in a fixed part header of an audio visual (A/V) packet;
    determining whether the portion of command and control packet is a first portion of command and control packet, wherein the determination is based upon a first portion flag associated with the portion of command and control packet; and
    when the portion of command and control packet is the first portion of command and control packet, flushing a buffer and storing the first portion of command and control packet in the buffer.

13. The non-transitory computer storage medium of claim 12, wherein the method further comprises:
    receiving a next portion of command and control packet; and
    determining whether the next portion of command and control packet is a last portion of packet.

14. The non-transitory computer storage medium of claim 13, wherein the method further comprises when the next portion of command and control packet is not the last portion of packet, storing the next portion of command and control packet in the buffer.

15. The non-transitory computer storage medium of claim 13, further comprising when the next portion of command and control packet is the last portion of command and control packet, reassembling the command and control packet.

16. The non-transitory computer storage medium of claim 12, the method further comprising when the portion of command and control packet is not the first portion of command and control packet, determining whether the portion of command and control packet is the last portion of command and control packet.

17. The non-transitory computer storage medium of claim 16, further comprising when the portion of command and control packet is not the last portion of command and control packet, storing the portion of command and control packet in the buffer.

18. The non-transitory computer storage medium of claim 16, further comprising when the portion of command and control packet is the last portion of command and control packet, reassembling the command and control packet.

19. A secure device performing a method comprising:
receiving a portion of a command and control packet, wherein the portion of the command and control packet is received in a header of an audio visual (A/V) packet;
determining whether the portion of command and control packet is a first portion of command and control packet, wherein the determination is based upon a first portion flag associated with the portion of command and control packet;
when the portion of command and control packet is the first portion of command and control packet, flushing a buffer and storing the first portion of command and control packet in the buffer;
receiving a next portion of command and control packet;
determining whether the next portion of command and control packet is a last portion of packet, wherein the determination is based upon a last portion flag associated with the next portion of command and control packet;
when the next portion of command and control packet is not the last portion of packet, storing the next portion of command and control packet in the buffer; and
when the next portion of command and control packet is the last portion of command and control packet, reassembling the command and control packet.

20. The secure device of claim 19, wherein the secure device is a smart card.

\* \* \* \* \*